(12) United States Patent
Gallagher et al.

(10) Patent No.: US 6,460,880 B1
(45) Date of Patent: *Oct. 8, 2002

(54) METHOD OF FORMING A MOTOR VEHICLE INSTRUMENT PANEL WITH A FLEXIBLY TETHERED AIR BAG DEPLOYMENT DOOR

(75) Inventors: Michael J. Gallagher, Hampton; John D. Gray, Union; Stephen D. Farrington, Kingston, all of NH (US)

(73) Assignee: Textron Automotive Company, Inc., Troy, MI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/127,681

(22) Filed: Jul. 31, 1998

Related U.S. Application Data

(63) Continuation-in-part of application No. 08/426,104, filed on Apr. 21, 1995, now Pat. No. 5,804,121.

(51) Int. Cl.$^7$ ............................................. B60R 21/16

(52) U.S. Cl. .................... 280/732; 280/728.3; 264/250; 264/255

(58) Field of Search .......................... 280/728.3, 743.2, 280/743.1, 731, 732; 264/250, 255

(56) References Cited

U.S. PATENT DOCUMENTS

| | | | |
|---|---|---|---|
| 5,013,065 A | | 5/1991 | Kreuzer |
| 5,044,663 A | * | 9/1991 | Seizert ........................ 280/730 |
| 5,096,221 A | | 3/1992 | Combs et al. .............. 280/732 |

(List continued on next page.)

FOREIGN PATENT DOCUMENTS

| | | |
|---|---|---|
| GB | 2250295 A | 6/1992 |
| JP | 4-143145 | 5/1992 |

*Primary Examiner*—Paul N. Dickson
*Assistant Examiner*—Ruth Ilan
(74) *Attorney, Agent, or Firm*—Grossman, Tucker, Perreault & Pfleger, PLLC

(57) ABSTRACT

A method of forming a motor vehicle instrument panel with a flexibly tethered air bag deployment door includes the steps of molding an instrument panel with a first plastics material to a desired shape and with an integral air bag deployment door whose opening is defined by a tear seam formed by a groove molded in one side of the panel and with an integral mounting/hinge flange that extends from an inside surface of the door, and forming a bonded layer of second plastics material on one side of the flange and the inside surface of a potentially frangible portion of the door. The second plastics material has the physical characteristic of remaining ductile to a substantial degree at low temperatures substantial below the temperature at which the first plastics material becomes brittle and as a result the bonded layer forms a tether that connects the frangible door portion to the mounting/hinge flange in a flexible manner when this door portion breaks away from the flange because of embrittlement of the first plastics material at the low temperatures on tearing of the tear seam and opening movement of the door by an inflating air bag pressing against the inside surface of the frangible door portion.

31 Claims, 7 Drawing Sheets

U.S. PATENT DOCUMENTS

| | | | |
|---|---|---|---|
| 5,116,079 A | | 5/1992 | Rhodes, Jr. |
| 5,158,322 A | * | 10/1992 | Sun .............................. 280/732 |
| 5,161,819 A | | 11/1992 | Rhodes, Jr. ................. 280/728 |
| 5,320,381 A | * | 6/1994 | Barnes et al. ............... 280/728 |
| 5,322,324 A | * | 6/1994 | Hansen et al. .............. 280/732 |
| 5,335,939 A | | 8/1994 | Kuriyama et al. |
| 5,378,014 A | | 1/1995 | Cooper ................... 280/728 B |
| 5,431,435 A | * | 7/1995 | Wilson .................... 280/728.3 |
| 5,549,324 A | * | 8/1996 | Labrie et al. ............. 280/728.3 |
| 5,564,731 A | * | 10/1996 | Gallagher et al. ........ 280/728.3 |
| 5,664,801 A | | 9/1997 | Gray et al. ............... 280/728.2 |
| 5,673,931 A | | 10/1997 | Gray et al. ............... 280/728.3 |
| 5,685,930 A | | 11/1997 | Gallagher et al. .......... 156/73.1 |
| 5,813,696 A | * | 9/1998 | Hill ......................... 280/743.2 |
| 5,901,976 A | * | 5/1999 | Kruezer et al. ........... 280/728.3 |
| 5,941,558 A | * | 8/1999 | Labrie et al. ............. 280/728.3 |

\* cited by examiner

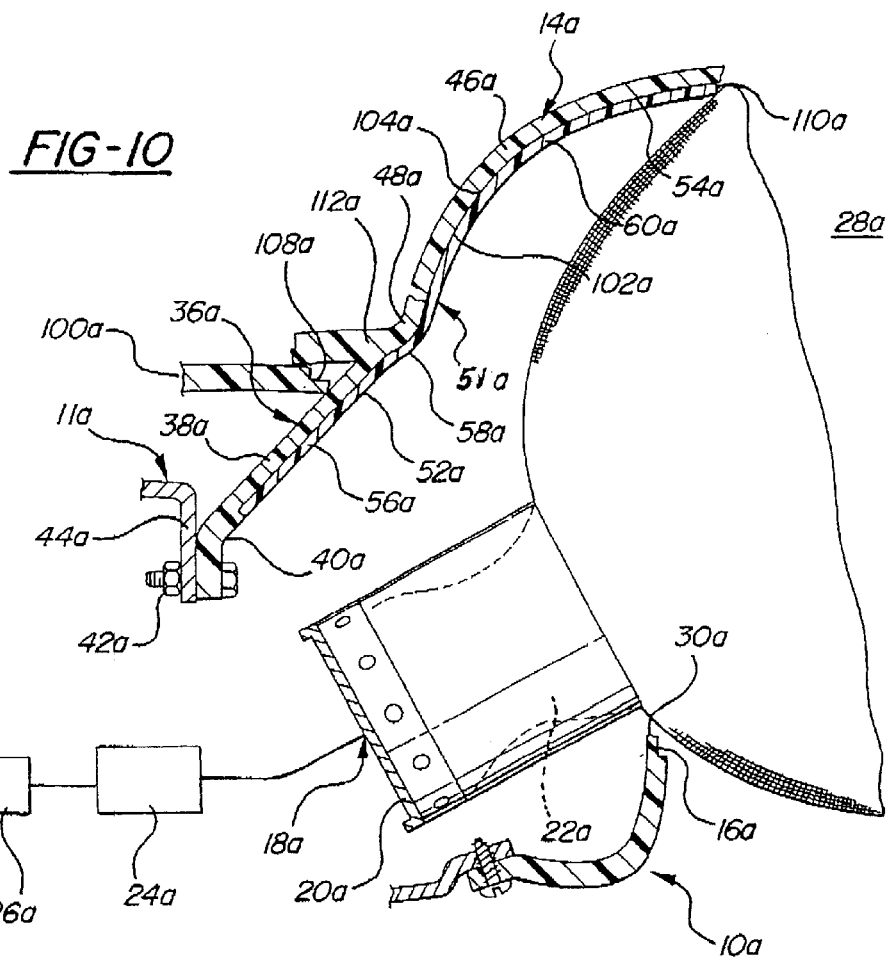
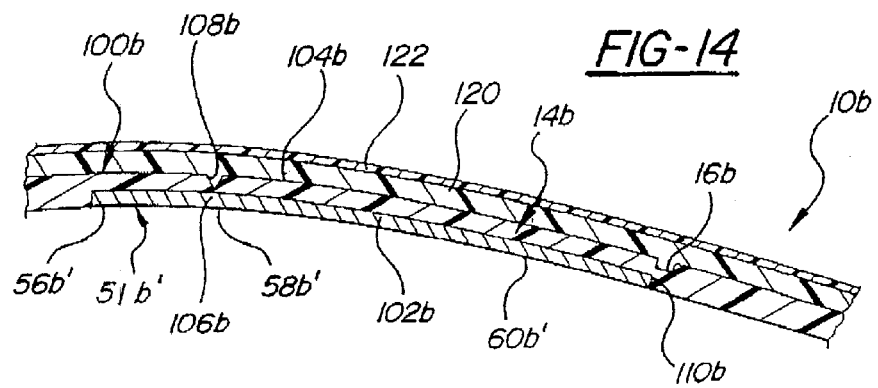

METHOD OF FORMING A MOTOR VEHICLE INSTRUMENT PANEL WITH A FLEXIBLY TETHERED AIR BAG DEPLOYMENT DOOR

This application is a continuation-in-part of U.S. Ser. No. 08/426,104, filed on Apr. 21, 1995, now U.S. Pat. No. 5,804,121 issued Sep. 8, 1998.

TECHNICAL FIELD

This invention relates to motor vehicle instrument panels having an integral air bag deployment door defined by a tear seam and more particularly to a tether for a potentially frangible air bag door when it is separated at very low temperatures from the instrument panel and then because of cold embrittlement from a flexible hinge that is integral with the door and normally provides through bending movement for opening swinging movement of the door and its retention to the vehicle structure at higher temperatures.

BACKGROUND OF THE INVENTION

Presently, most passenger side air bag doors are formed in an air bag cover that is separate from the instrument panel because the latter is made of various commercially available thermoplastic materials that are particularly well suited to meeting the requirements of its application but are not well suited to meeting the requirements of an air bag door that is defined by a tear seam formed in a single layer instrument panel. For example, the plastics materials used to make such an instrument panel must have a certain degree of stiffness and high heat resistance to meet the requirements of its application but the materials that are currently available for such an application do not retain ductility and become embrittled at very low or cold temperatures. This lack of low temperature ductility is undesirable for air bag deployment where the air bag door is formed integral with and defined by a tear seam that is formed in the instrument panel and is torn to provide an air bag deployment opening in the panel by the force of the inflating air bag acting on the panel in the area of the tear seam. Styrene-maleic anhydride, polypropylene, polycarbonate, polyphenylene oxide and polyurethane are examples of thermoplastic materials that are suitable for such an instrument panel but have not exhibited the required ductility for such a tear-open air bag door at very low temperatures and as a result a portion or portions of the door may fracture and separate from the instrument panel on deployment of the air bag and undesirably enter the space of the passenger compartment. To meet extreme low temperature requirements, many various designs of an air bag deployment door have been proposed wherein the door is made separate from the panel and is installed as a hinged door assembly on the instrument panel so that the door is not prone to fracture from cold embrittlement by the force of the inflating air bag as it freely swings open on its hinge from the force of the air bag.

Costs can be reduced, quality can be improved and styling can be enhanced by molding the instrument panel and the air bag cover including an integral air bag deployment door in one piece at the same time out of the same commercially available material. That is provided that the normal material requirements for the instrument panel are not sacrificed while the safe assured operability of the integral air bag deployment door is still somehow retained at reasonable cost even though its plastics material is not well suited thereto.

SUMMARY OF THE PRESENT INVENTION

In the present invention, a molded motor vehicle instrument panel made of a thermoplastic material well suited for the primary purpose of such a panel has an integral air bag deployment door for a passenger side air bag that is safely retained to the vehicle structure in a very cost effective manner. The air bag door is defined by a tear seam in the panel and is normally retained by an integral flexible mounting/hinge flange to a part of the vehicle structure when the seam is torn by the inflating air bag and wherein this flange which before was integral with both the door and the panel is then separated from the main body of the panel while remaining integral with the door and bends to allow the door to swing open to allow deployment of the air bag through an opening in the instrument panel while retaining same to the vehicle structure as the door is then free of the instrument panel. At very low temperatures, a portion of the air bag door can break away from the mounting/hinge flange where it joins therewith because of plastic embrittlement at these low temperatures and the high bending stresses encountered at this juncture.

This separation of the broken door portion from the vehicle structure is prevented by bonding a layer of second plastics material over the juncture zone and an adjoining inside surface of the potentially frangible door portion and an adjoining one side of the mounting/hinge flange. The second plastics material has the physical characteristic of remaining ductile to a substantial degree at low temperatures substantially below the temperature at which the first plastics material becomes brittle. The bonded layer thus forms a tether that tethers the frangible door portion to the mounting/hinge flange in a flexible manner when this door portion breaks away from the flange because of embrittlement of the first plastics material at the low temperatures on tearing of the tear seam and opening movement of the door by the inflating air bag pressing against the inside surface of the frangible door portion. This allows the broken door portion to continue movement in it opening direction to allow continued deployment of the air bag while the broken door portion remains connected by the flexible tether to the mounting/hinge flange and thereby the vehicle structure.

The instrument panel and the air bag deployment door tethering layer may be formed in various ways including injection molding the panel and injection molding, spraying or low pressure molding the tethering layer in a second step. Such formation of the tether in place as a bonded layer is particularly advantageous from both a cost and production standpoint as it becomes integral with the instrument panel and there is no need to inventory a separate tether that must then be fastened by some form of fastening means to both the mounting/hinge flange and the door. Furthermore, the bonding of the tethering layer to the inside surface of the door hides its presence from view which is desirable from an appearance or styling standpoint.

It is therefore an object of the present invention to provide a new and improved method of forming a motor vehicle instrument panel with an integral air bag deployment door and a flexible tether for the door.

Another object is to provide a new and improved method of forming a motor vehicle instrument panel with an integral air bag deployment door and a flexible tether for the door at low cost and of high quality and to meet certain styling desires.

Another object is to provide a method of forming a motor vehicle instrument panel with a tethered air bag deployment door wherein the panel including the door is formed of a plastics material suited to meet the requirements of an instrument panel and the tether is formed of a layer of plastics material that spans a potential fracture zone in the door and remains ductile at low temperatures that cause embrittlement of the door that could result in the fracturing of a portion of the door at thus fracture zone on air bag deployment and loss of its retention to the vehicle structure but for the tethering layer.

Another object is to provide a method of forming a motor vehicle instrument panel including an air bag deployment door that is defined by a tear seam molded in the panel wherein the panel is formed of a plastics material suited to its requirements and the door is retained to the vehicle structure on breaking away at very cold temperatures by a flexible layer of plastics material that is formed in place over an inside surface of the door and one side of a mounting/hinge flange that is molded integral with the inside surface of the door and normally retains the air bag door to the vehicle structure on opening movement.

Another object is to provide a low cost, high quality motor vehicle instrument panel with flexibly tethered air bag deployment door produced by the above method.

A second aspect of the present invention includes an automotive air bag cover assembly comprising a hinge panel that is connected, in a layered disposition, to an inside surface of at least one of the integral air bag cover and instrument panel. The instrument panel comprises a first plastics material and is configured to mount in the passenger compartment of the motor vehicle. The air bag door panel also comprises the first plastics material and is formed with the instrument panel as a single integral panel. The door panel is at least partially surrounded by the instrument panel. One object of this second aspect of the present invention is to simplify and accelerate the manufacture of hinged integral panels by providing a hinge panel that is insert molded into an inside surface of at least one of the instrument panel and the door panel.

Another object of the second aspect of the present invention is to provide a hinge panel to act as a primary hinge between the door panel and the instrument panel during air bag deployment. The hinge panel spans a panel juncture zone between the door panel and the instrument panel.

Another object of the second aspect of the present invention is to aid in bending the first plastics material at the hinge location by providing a panel juncture zone that includes a styling groove separating at least a portion of the door panel and the instrument panel. The styling groove may also function as a tear seam.

Another object of the second aspect of the present invention is to guide tearing around the door panel when the air bag inflates by providing a panel juncture zone that includes a weakened tear seam separating at least a portion of the door panel and the instrument panel.

Another object of the second aspect of the present invention is to provide a hinge that includes a hinge panel edge aligned with at least a portion of the tear seam to act in guiding tearing along the tear seam as the door is forced open during air bag inflation.

Another object of the second aspect of the present invention is to prevent hinge panel fracture at low temperatures by providing a hinge panel comprising a second plastics material that is more ductile and less brittle at low temperatures than the first plastics material.

Another object of the second aspect of the present invention is to prevent hinge panel fracture by providing a hinge panel comprising metal.

Another object of the second aspect of the present invention is to provide a means of securing the door panel to a structural member during deployment by providing a hinge flange that extends transversely inward from the inside surface of the door panel. The hinge flange is configured to secure the door panel to a structural member. The hinge panel spans a juncture zone between the hinge flange and door panel in a layered disposition with a portion of the hinge panel being attached to the hinge flange.

Another object of the second aspect of the present invention is to provide a means for supporting an air bag canister assembly on the instrument panel by providing a collar that extends transversely inward from the inside surface of the instrument panel and from around the door panel. The collar defines a door-collar interface along the region where the collar extends from the panel. The hinge panel spans the door-collar interface, one portion of the hinge panel being attached to the collar and another portion of the hinge panel being attached to the door panel.

Another object of the second aspect of the present invention is to provide a method for making an air bag cover assembly. The method includes providing a mold having first and second mold portions. The first and second mold portions form a mold cavity when closed together. The mold cavity has a shape that complements the shape of the integral instrument and door panel and the hinge panel. After being formed separately, the hinge panel is placed in the second mold portion. The mold is then closed and the first plastics material is introduced into the mold cavity in molten form. The molten first plastics material is then allowed to conform to the shape of the mold cavity and to solidify in the mold cavity. The mold is then opened and the completed assembly is removed from the mold.

The method may also include formation of the hinge panel from the second plastics material and the selection of a second plastic material that is more ductile and less brittle at low temperatures than the first plastics material.

The method may alternatively include the provision of a hinge panel comprising metal. In applications where an edge of the hinge panel is aligned with a tear seam to guide tearing along the tear seam, metal is generally preferred over plastic due to increased rigidity which aids in evenly distributing door opening forces along a tear seam to promote more uniform tear seam fracture and subsequent door opening.

The method may also include the placement of the hinge panel on the mold cavity surface of the second mold portion in a position spanning a portion of the mold configured to form the panel juncture zone between the instrument panel and door panel portions of the integral panel. The mold cavity surface of the second mold portion may be shaped to form a hinge-flange that protrudes transversely inward from the door panel portion of the integral panel. In this case, the hinge panel is placed on the mold cavity surface of the second mold portion in a position spanning a portion of the mold configured to form a flange juncture zone between the hinge-flange and the door panel.

These and other objects, advantages and features of the present invention will become more apparent from the following description and the accompanying drawings wherein:

BRIEF DESCRIPTION OF THE DRAWINGS

FIG. 10 is a cross-sectional side view of the instrument panel of FIGS. 8 and 9 with the air bag deployment door being fractured as it is moved out of the closed position by an inflating air bag;

FIG. 14 is a cross-sectional side view of a motor vehicle instrument panel constructed according to the invention and including an integral air bag deployment door and including a metal insert molded hinge.

DETAILED DESCRIPTION OF THE DRAWINGS

Figure 1:
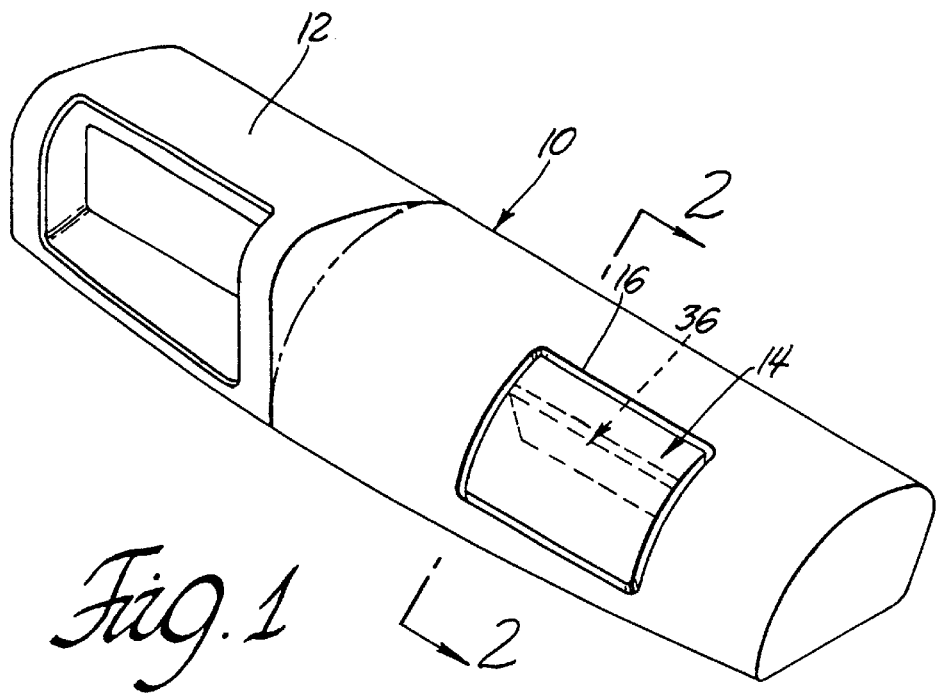
FIG. 1 is a perspective view of a motor vehicle instrument panel including integral air bag deployment door with a flexible tether made according to the present invention and as installed in a motor vehicle over an air bag system.

Referring to FIGS. 1–4, there is illustrated a molded instrument panel air bag cover assembly 10 for concealing an inflatable air bag system of a motor vehicle. The motor vehicle structure is generally designated as 11. Alternative embodiments of the instrument panel cover assembly 10 are generally shown at 10a in FIGS. 8–10, 10b in FIGS. 11–14, and 10c in FIG. 15. Reference numerals with the suffix "a" in FIGS. 8–10, the suffix "b" in FIGS. 11–14 and the suffix "c" in FIG. 15 designate the alternative configuration of each element common to the embodiment of FIGS. 1–4. Unless the description indicates otherwise, where the description uses a reference numeral to refers to an element in FIGS. 1–4, I intend that portion of the description to apply equally to elements in FIGS. 8–10, 11–14 and 15; indicated by the same reference numeral with the suffix "a", "b" or "C"; respectively.

The cover assembly 10 has a contoured section 12 on the driver side for the installation of an instrument cluster (not shown) and an air bag deployment door 14 of rectangular shape on the passenger side that is defined by a tear seam 16 molded in the cover assembly. The tear seam 16 may be formed by a groove either in the face of the panel as shown or by a similar groove in the back side of the panel to hide the tear seam from view as is well known in the art. The cover assembly covers an air bag system 18 that is located behind the cover assembly directly behind the air bag door 14 and is mounted on a sheet metal portion 20 of the vehicle structure at the front of the passenger compartment. The air bag system 18 is of a conventional type that includes an inflatable air bag 22, a gas generator 24 and a controller 26 that includes a vehicle impact sensor and triggers ignition of the gas generator to inflate the air bag for deployment into the passenger space 28 directly in front of a passenger seated on this side.

Figure 4:
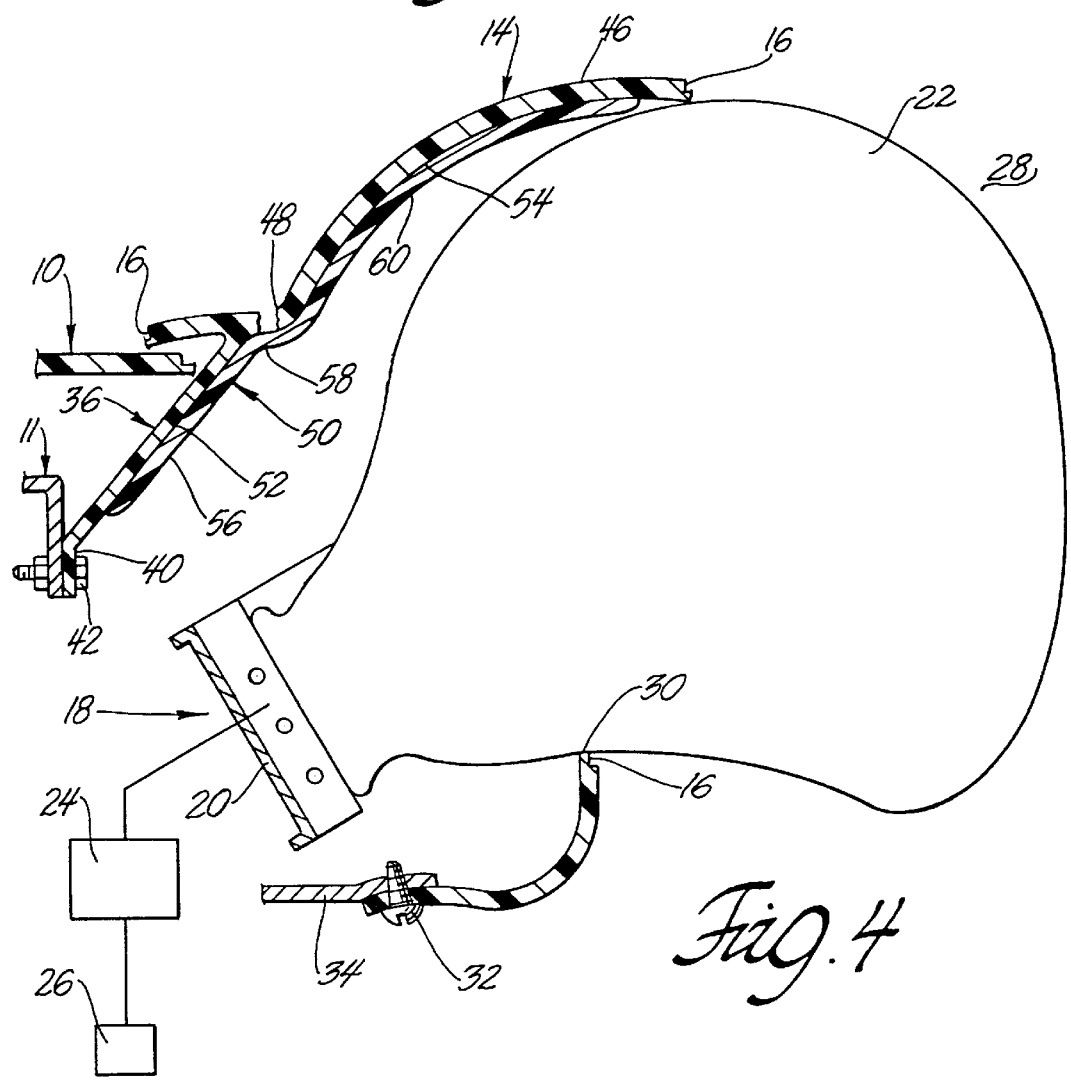
FIG. 4 is a view like FIG. 2 but showing the air bag door opened and broken during the deployment of the air bag at a very low temperature.

The cover assembly 10 is a molded one-piece part of generally uniform wall thickness and is formed of a suitable thermoplastic material such as styrene-maleic anhydride, polypropylene, polycarbonate, polyphenylene oxide and polyurethane that provides sufficient stiffness so that the panel is self-supporting to maintain the desired shape and has sufficient heat resistance to resist deformation due to heat in its interior vehicle environment where it is located immediately behind the windshield (not shown). The cover assembly may be molded in various conventional ways including injection molding as is well known in the art. The groove forming the tear seam 16 is made deep enough in relation to the wall thickness of the cover assembly and the strength of the plastic material used so as to sufficiently weaken the wall section at the tear seam to the point that it is torn by the force of the inflating air bag acting against the back or inside surface of the air bag door and creates on its separation from the cover assembly an opening 30 therein for the deployment of the air bag as illustrated in FIG. 4 and described in more detail later.

Figure 2:
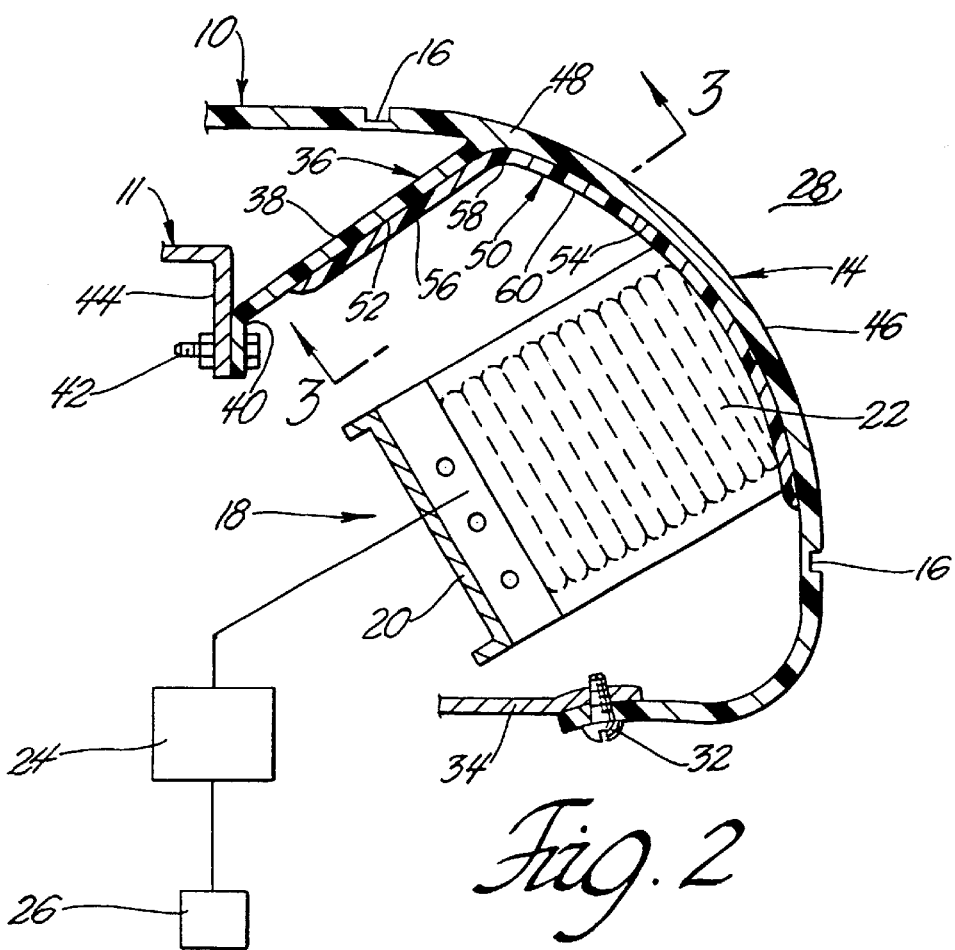
FIG. 2 is an enlarged view taken along the line 2—2 in FIG. 1 when looking in the direction of the arrows.

The cover assembly 10 is fastened to portions of the vehicle structure 11 at various locations outside the area of the air bag door with one such location being shown in FIG. 2 wherein a sheet metal screw 32 fastens the panel at a lower edge thereof beneath the air bag door to a sheet metal portion 34 of the vehicle structure. In addition, it will be understood that similar screws or other conventional type fasteners are used at other locations outside the area of the air bag door to securely fasten the cover assembly in place on the vehicle structure.

Figure 3:
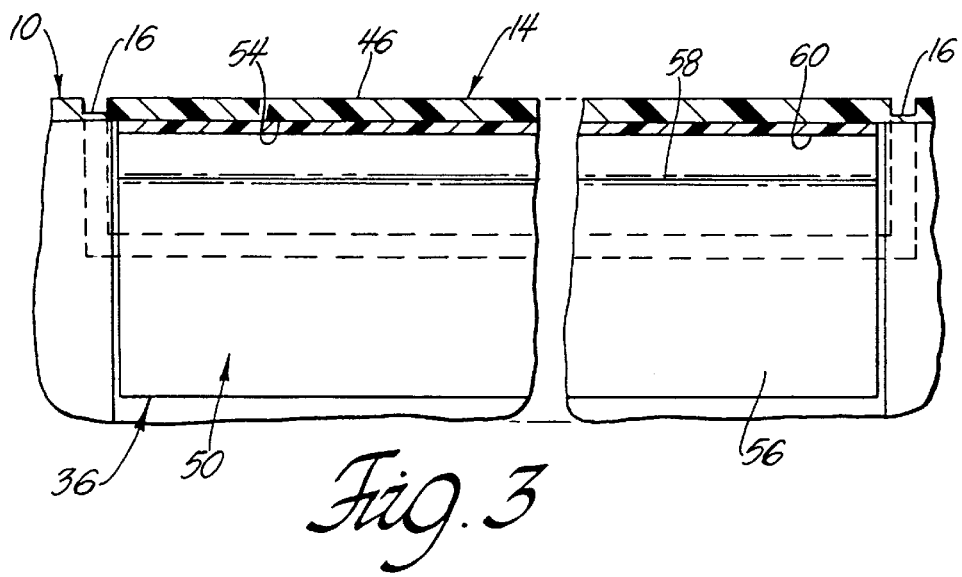
FIG. 3 is a view taken along the line 3—3 in FIG. 2 when looking in the direction of the arrows.

The air bag deployment door 14 in the cover assembly 10 is separately fastened to the vehicle structure by an elongated mounting/hinge flange 36 that is molded integral with the back inside surface of the door and extends horizontally along substantially the entire length and adjacent to the upper edge thereof as seen in FIGS. 1–3. The flange 36 has a flat rectangular portion 38 that extends inwardly of the door a substantial distance and terminates in a flat, rectangular, angled, horizontally extending, distal portion 40 that is fastened along its length by bolts 42 to a sheet metal portion 44 of the vehicle structure. The flange 36 is also formed with a controlled thickness and is capable of elastic bending to a significant degree in the rectangular portion 38 in a certain substantial temperature range and down to a certain low temperature (e.g. –20° F.) without breaking and thereby act as a cantilever hinge to normally provide for outward swinging opening movement of the door when the door is separated along the tear seam from the cover assembly for air bag deployment. Prior to such air bag door separation, the flange 36 acts to fasten the cover assembly to the vehicle structure at the air bag door and also provides support for the latter against a pushing force such as from a passenger which could otherwise push the door inward and separate the door from the cover assembly along the tear seam.

The flange 36 is designed to normally hinge and retain the air bag door 14 to the vehicle structure during its outward opening movement when the tear seam 16 is torn by the force of the inflating air bag and in doing so is highly stressed at its juncture 48 with the door as the flange portion 38 bends to effect swinging movement of the door. However, at very low or cold temperatures such as −20° F. and below, the typical plastic material suitable for the cover assembly in its primary application can become brittle to the point where the lower and major portion 46 of the door, that is forced by the inflating air bag to bend outward about the horizontally extending juncture 48 of the door with the flange 36, may fracture or break off at this highly stressed location or zone (see FIG. 4) and enter into the passenger space 28. This is prevented in a very cost effective manner by the strategic addition of a flexible door tethering layer 50 of controlled thickness that is formed in place over the one side 52 of the mounting/hinge flange 36 adjoining the potential fracture zone 48, over this zone, and over the inside surface 54 of the potentially frangible door portion 46. The material forming the door tethering layer 50 is a flexible plastics material of a prescribed controlled thickness that is formed in place as described in more detail latter, bonds in its formation without an added adhesive to the material of the cover assembly, and remains flexible or ductile at temperatures substantially below that at which the material of the cover assembly 10 including the integral air bag deployment door 14 becomes brittle. Examples of such material for the tethering layer 50 that will remain flexible or ductile at temperatures as low as −60° F. are polyurethane elastomers, polyester elastomers, and polyolefin elastomers. In addition, it will be understood of course that the tethering material while well suited for its application is not suited to meet the stiff requirements of the cover assembly.

The flexible tethering layer 50 extends horizontally substantially the entire length of the mounting/hinge flange 36 and is bonded to the side 52 of the flat flange portion 38 at a margin portion 56 of the tethering layer that extends laterally to the distal flange portion 40 so as to maximize the bonding area on this side of the potential fracture zone 48 and thereby maximize the retention of the tethering layer to the flange 36. The tethering layer 50 spans and is bonded to the potential fracture zone 48 at an intermediate portion 58 of the tethering layer and is bonded to the inside surface 54 of the potentially frangible air bag door portion 46 at a margin portion 60 that extends laterally to near the lower edge of the door so as to maximize the bonding area of the tethering layer with this door portion and its retention to the flange 36.

Referring to FIG. 4, the tethering layer 50 at its intermediate portion 58 that spans the potential fracture zone flexes when door breakage occurs because of cold plastic embrittlement to permit the broken door portion 46 to continue to swing outward and upward about the line of fracture at the flange 36 to provide for continued air bag deployment while retaining the broken door portion safely to the vehicle structure with the tethering layer 50 and flange 36. The bonded retention of the tethering layer over substantially the entire inside surface of the separated door portion 46 and that of the bending portion 38 of the flange 36 maximizes the retention forces available from the tethering layer 50 across the door fracture to retain the broken door portion 46 to the flange 36 and thus to the vehicle structure. And the controlled thickness of the tethering layer 50 is determined in relation to the tensile strength of it plastics material so as to not fail in bending tension at its intermediate portion 58 at the greatest anticipated forces acting thereon from the propelled mass of the broken door portion 46. However, it will also be understood that the intermediate bending portion 58 of the tether layer 50 could have a greater thickness than the adjoining margin portions 58 and 60 for greater tensile strength as necessary in a particular application to conserve material and/or space.

The cover assembly 10 including the integral air bag deployment door 14 and the mounting/hinge flange 36 is molded in one-piece at one time of the same plastics material such as that previously described which is suitable for the primary purpose of an cover assembly wherein it must be sufficiently stiff for self support and resistant to heat. The cover assembly 10 is molded in a conventional manner well known in the art and may be formed for example in an injection mold or reaction injection mold whose mold cavity completely defines the surfaces of the cover assembly including the groove defining the tear seam 16 in either the outside or inside surface.

Figure 5:
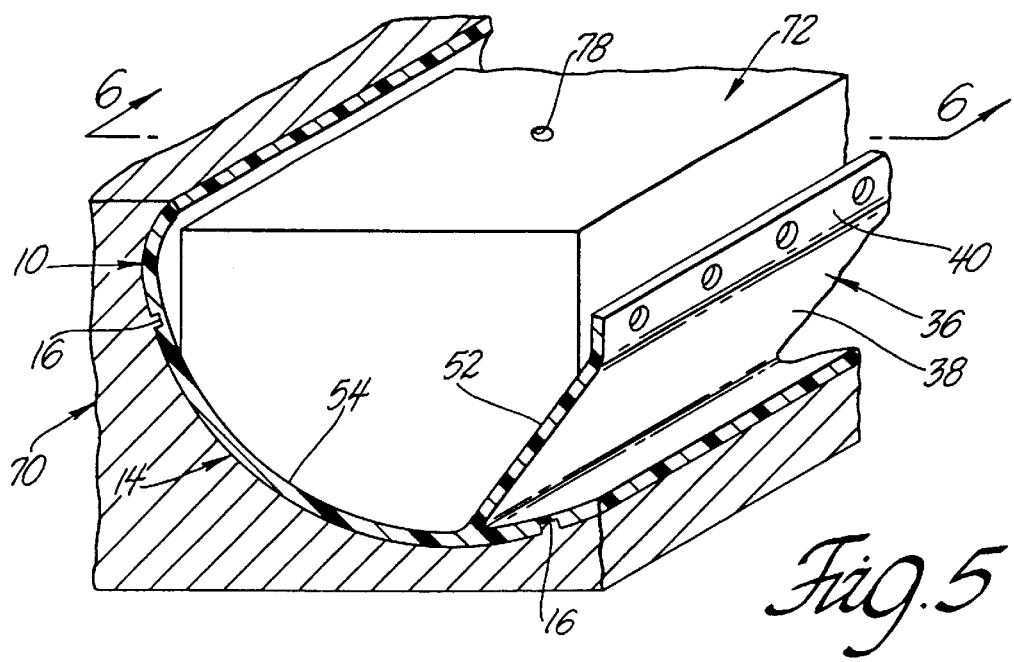
FIG. 5 is a fragmentary perspective view of mold tools used to mold the flexible tethering layer in FIGS. 2 and 3 and includes a sectional view of the instrument panel as molded and then located between these tools for the molding of the flexible tethering layer.
Figure 6:
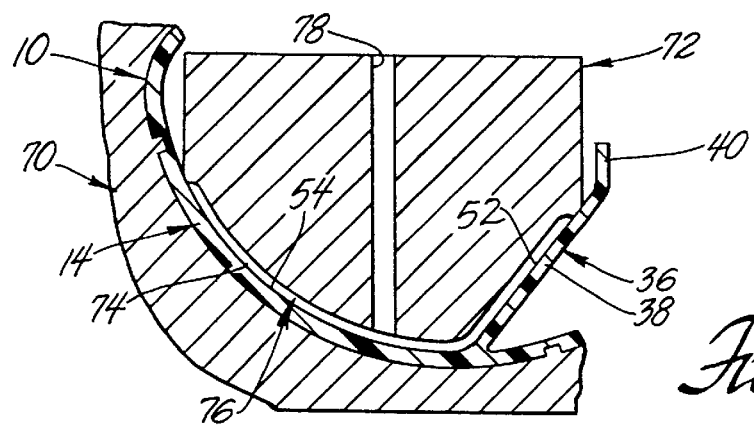
FIG. 6 is view taken along the line 6—6 in FIG. 5 when looking in the direction of the arrows.

Referring to FIGS. 5 and 6, there is shown the appearance side mold tool 70 of an injection mold used to mold the appearance or front side of cover assembly 10 which is shown in place as molded thereby in these illustrative views and wherein the flexible tethering layer is yet to be formed. And it will be understood that the injection mold for the cover assembly 10 further includes another mold tool (not shown) that defines the back side of the panel and cooperates with the mold tool 70 to form a mold cavity into which the plastics material for the panel is injected in molten form under pressure in a conventional manner. With the molded cover assembly 10 left in place in the mold tool 70 and the back side mold tool moved out of the way, the air bag deployment door tethering layer 50 may then be formed in place with an injection mold tool 72 that seats against the inside surface of the cover assembly over the area in which the tethering layer 50 is to be formed and which includes the side 52 of the mounting/hinge flange 36 and the inside surface 54 of the frangible door portion 46. It will also be understood that the cover assembly could be supported by a dedicated support tool that is much smaller than the cover assembly mold tool 70 and has a similar support surface that just spans the area of the outer side of the molded cover assembly opposite where the tethering layer is to be formed. The injection mold tool 72 is formed on its molding side with a tethering layer defining cavity 74 that is closed by the side 52 of the mounting/hinge flange 36 and the inside surface 54 of the frangible door portion 46 and defines therewith a closed mold cavity 76 that defines the entirety of the tethering layer shape.

The mold tools 70 and 72 with the cover assembly 10 located there between are clamped together in a conventional type plastics injection molding machine (not shown) and the tethering plastics material as earlier described is injected in molten form under high pressure in a conventional manner through a passage 78 in the mold tool 72 into the closed mold cavity 76 to form the flexible tethering layer 50. It will also be understood that a low pressure mold tool with a tethering layer defining mold cavity like the cavity 74 in mold tool 72 but with the low pressure mold tool suitably adapted in a conventional manner for gravity molding, reaction injection molding, or resin transfer molding of the tethering layer with reactive components of the plastics material can also be used to mold the tethering layer in place on the inside surface of the cover assembly. In either case, the plastics material forming the tethering layer bonds without an added adhesive to the inside surface of the cover assembly to form a strong attachment thereto over the entire extensive interface between the tethering layer 50 and both the mounting/hinge flange 36 and the frangible door portion 46.

Figure 7:
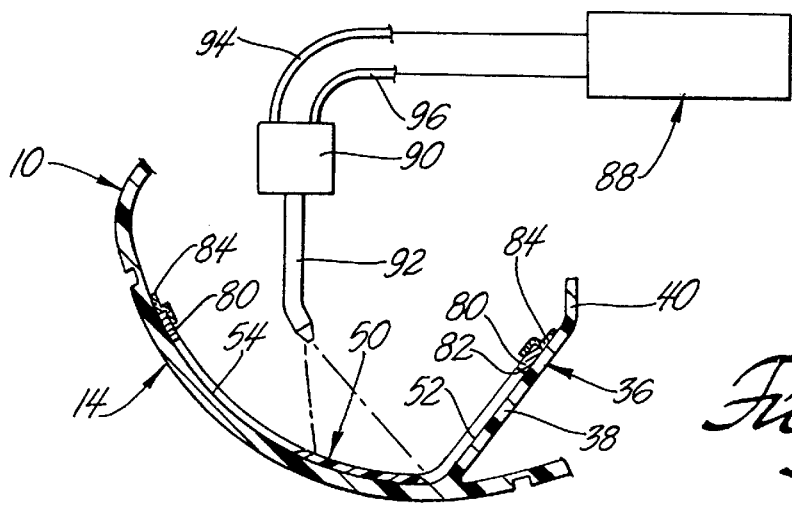
FIG. 7 is a sectional view of the instrument panel as molded without the flexible tethering layer and includes a diagrammatic view of spraying apparatus for forming the flexible tethering layer.

The tethering layer 50 may also be formed in place on the inside surface of the cover assembly by spraying the tether forming plastics material as illustrated in FIG. 7. This is preferably accomplished with a mask 80 of controlled thickness that is laid against the side 52 of the mounting/hinge flange 36 and the inside surface 54 of the frangible door portion 46 in interfacing relationship therewith and has an opening 82 that defines the periphery of the tethering layer 50. The mask 80 has the desired thickness of the tethering layer or a slightly greater thickness and may be formed of metal or plastic and either be flexible so as to readily conform to the surface to be masked or be preformed with the required interfacing shape. The mask 80 is held in place by suitable means such as by flanges 84 fixed to a robot arm and the outer surface 86 of the mask is coated with a suitable release agent such as silicone to prevent the tether forming plastics material from adhering thereto.

With the mask 80 held in place on the inside surface of the cover assembly, the tether forming plastics material is sprayed through the mask opening 82 onto the unmasked area of the panel to form the tethering layer 50 using a conventional type plastics spraying system 88 that includes a suitable mixing head 90 having a spray wand 92. The spraying system 88 operates in a conventional manner to effect spraying on command and wherein reactive components of the plastics material are delivered to the mixing head 90 by separate lines 94 and 96 and these components are mixed in the mixing head just prior to spraying with the wand 92. The mixing head 90 may be manipulated by an operator or a robot and the mixed plastics material is dispensed from the mixing head through the spray wand onto the unmasked area of side 52 of the mounting/hinge flange 36 and the inside surface 54 of the frangible door portion 46 as illustrated in FIG. 7 to form the tethering layer to the desired controlled thickness. Then on setting of the sprayed plastics material, the mask is removed leaving the tethering layer in place and bonded without adhesive to the cover assembly.

Summarizing examples of the plastics materials that can be used in the above molding processes to form the tethering layer; the gravity molding material can be a thermoset material such as polyurethane, the resin transfer molding material can be a thermoset material such as polyester, the reaction injection molding material can be a thermoset material such as polyurethane, the spray molding material can be a thermoset material such as polyurethane, and the injection molding material can be thermoplastic material such as polyolefin.

As shown in FIGS. 8–10, 11–14 and 15, respectively, the second, third and fourth embodiments 10a–c of the cover assembly 10 each comprise an instrument panel generally indicated at 100a–c. In each of these embodiments the instrument panel 100a–c comprises a first plastics material and is configured to mount in the passenger compartment of the motor vehicle. An air bag door panel shown at 14a–c also comprises the first plastics material and is formed with the instrument panel 100a–c as a single integral and unitary panel 14a–c, 100a–c. The door panel 14a–c is at least partially surrounded by the instrument panel 100a–c.

In each of the second through fourth embodiments, a hinge panel, shown at 51a–c, is connected to an inside surface 102a–c of the unitary panel 14a–c, 100a–c in a layered disposition. The inside surface 102a–c is disposed opposite an outside or "class A" surface 104a–c of the unitary panel 14a–c, 100a–c. The hinge panel 51a–c comprises a second plastics material that is more ductile and less brittle at low temperatures than the first plastics material. The hinge panel 51a–c is insert molded into an inside surface of at least one of the instrument panel 100a–c and the door panel 14a–c. As shown at 50b' in FIG. 14, in other embodiments the hinge panel 51 may comprise sheet metal or both sheet metal and plastic. Metal is especially advantageous as a component of an aft edge of the hinge panel aligned with a tear seam due to increased rigidity which aids in distributing door opening forces more evenly along the tear seam to promote more uniform tear seam fracture and subsequent door opening.

As shown in FIGS. 8–15, the hinge panel 51a–c includes a hinge panel aft edge 110a–c aligned with an aft portion of the tear seam 16a relative to the direction of door opening during air bag inflation. The alignment of the aft portion of the tear seam 16a and the hinge panel aft edge 110a–c helps to guide tearing along the tear seam 108.

Figure 8:
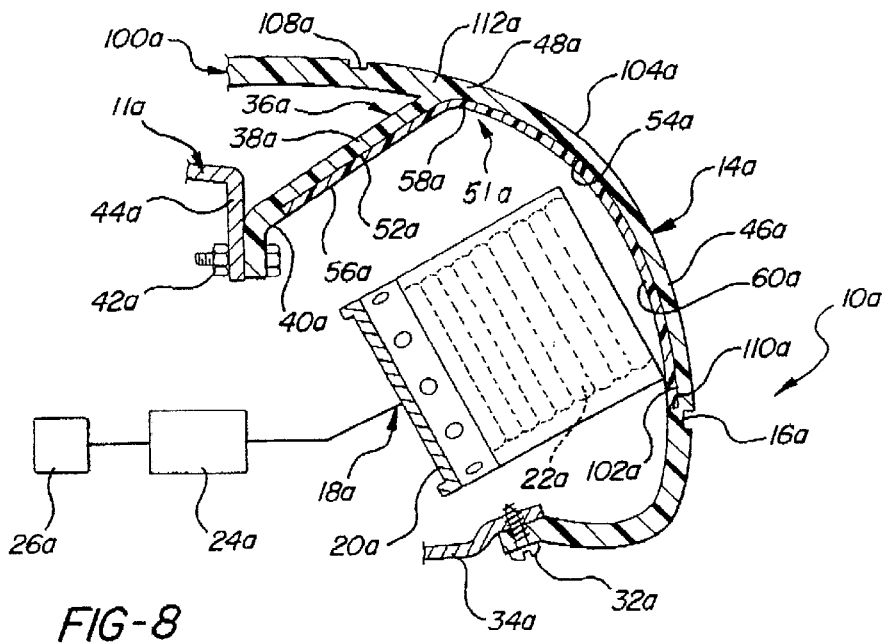
FIG. 8 is a cross-sectional side view of a motor vehicle instrument panel constructed according to the invention and including an integral air bag deployment door in a closed position, a plastic insert molded hinge and an integral mounting/hinge flange.
Figure 9:
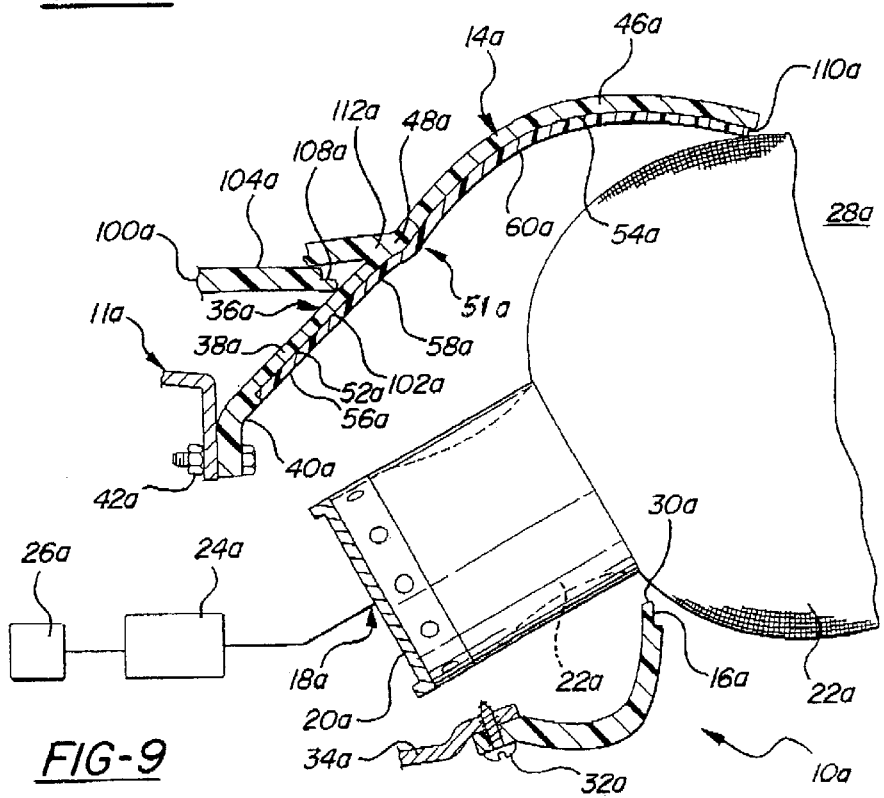
FIG. 9 is a cross-sectional side view of the instrument panel of FIG. 8 with the air bag deployment door being moved out of the closed position by an inflating air bag.
Figure 11:
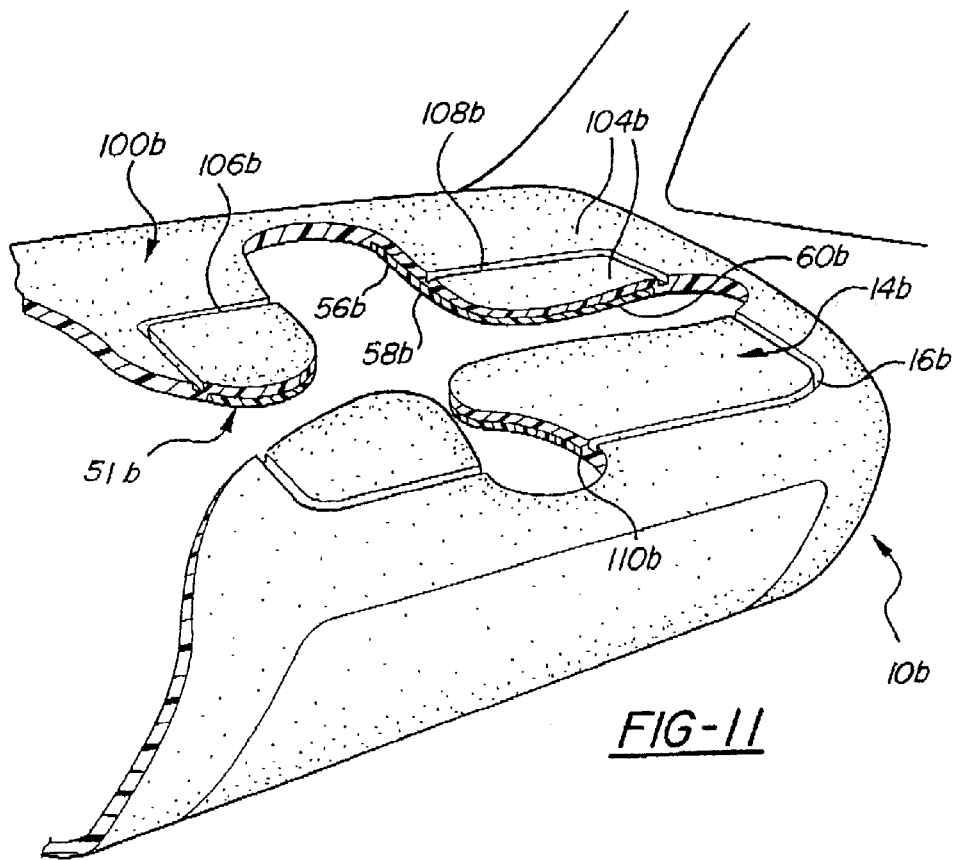
FIG. 11 is a perspective view of a motor vehicle instrument panel including integral air bag deployment door having a plastic insert molded hinge constructed according to the present invention and as installed in a motor vehicle over an air bag system.
Figure 12:
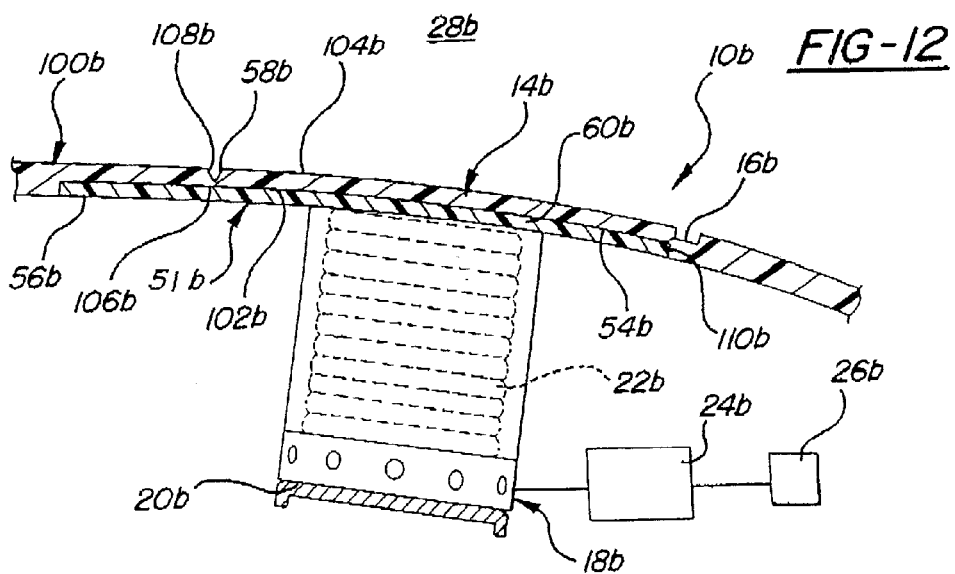
FIG. 12 is a cross-sectional side view of the instrument panel and air bag system of FIG. 11 with the air bag deployment door in a closed position.
Figure 13:
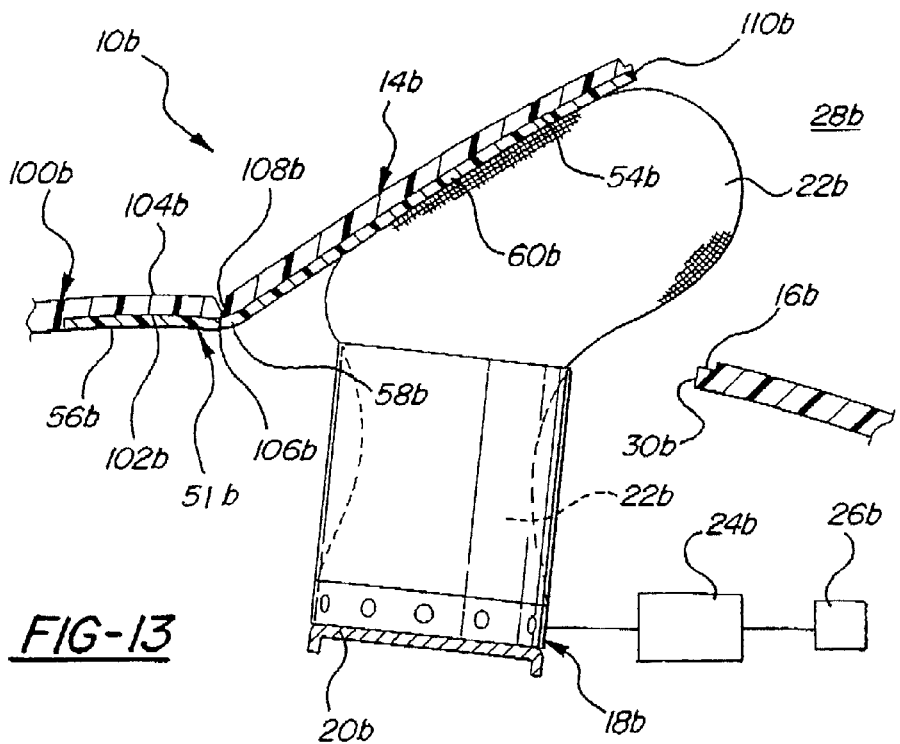
FIG. 13 is a cross-sectional side view of the instrument panel and air bag system of FIG. 11 with the air bag deployment door being moved out of the closed position by air bag inflation.

As shown in FIGS. 8–10, the door panel 14a of the second embodiment includes a hinge flange 36a extending transversely inward from the inside surface 54a. As is described in detail with respect to the first embodiment, above, the hinge flange 36a is configured to secure the door panel 14a to a structural member 44a. The hinge panel 51a spans a flange juncture zone, shown at 112a in FIGS. 8–10, where the hinge flange 36a integrally extends from the inside surface of the door panel 14a. The hinge panel 51a acts as a secondary hinge and a tether in the event the door panel 14a should fracture at the flange juncture zone 112a—or at any other point spanned by the hinge panel 51a. The hinge panel 51a is attached to the hinge flange 36a and door panel 14a in a layered disposition by insert molding.

As is also shown in FIGS. 8–10, a forward tear seam portion 108a of the weakened tear seam 16a runs parallel to and adjacent the panel juncture zone 112a of the second embodiment. The forward tear seam portion 108a delineates a boundary between a forward portion of the door panel 14a and the instrument panel 100a. The forward tear seam portion 108a completes a full 360° tear seam path for the tear seam 16a that defines the entire outline of the air bag door panel 14a. Therefore, upon air bag inflation, the entire door panel 14a is torn free of the instrument panel 100a and is tethered only by the hinge flange 36a. Alternatively, the forward tear seam portion 108a may be omitted.

As shown in FIGS. 11–14, the hinge panel 51b of the third embodiment spans a panel juncture zone 106b between the door panel 14b and the instrument panel 100b. The hinge panel 51b acts as a secondary hinge between the door panel 14b and the instrument panel 100b during air bag deployment. The hinge panel 51b may lie flush with the inside surface. However, in other embodiments, the hinge panel 51b may be molded in a raised position to allow for a constant thickness of the first material over the unitary panel 14b, 100b.

As shown in FIGS. 11–14, the panel juncture zone 106b of the third embodiment may include a styling groove 108b separating at least a portion of the door panel 14b and the instrument panel 100b. The styling groove 108b may be formed by methods other than injection molding such as laser scoring, cutting or melting. The styling groove 108b promotes upward bending of the first plastics material at the hinge location by removing material that would otherwise impede such upward bending.

As shown in FIG. 14, a urethane foam layer 120 may be disposed over the unitary panel 14b and a plastic skin layer 122 may be disposed over the foam layer. While the foam and skin layers 120, 122 are shown on the unitary panel 14b of the embodiment of FIG. 14, such layers may also be included in any embodiment of the invention.

Figure 15:
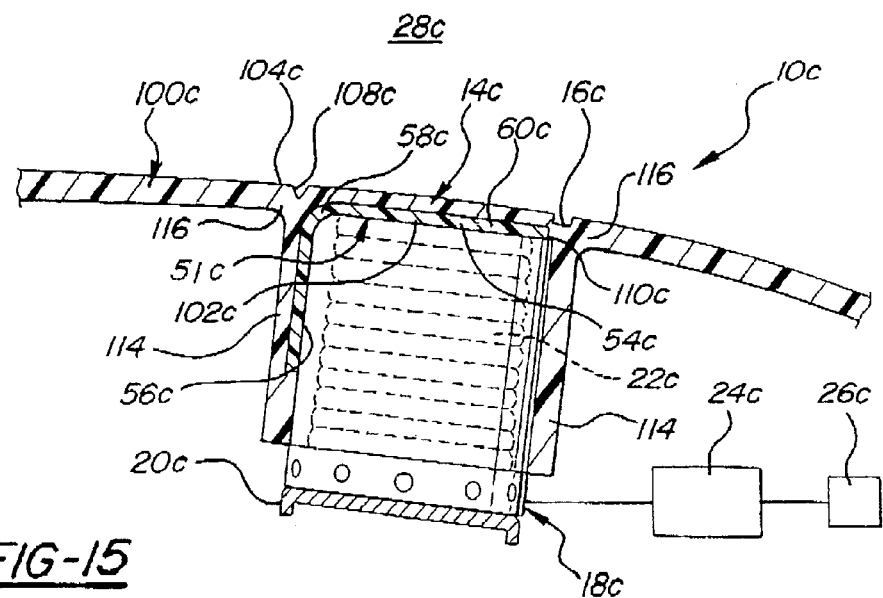
FIG. 15 is a cross-sectional side view of a motor vehicle instrument panel constructed according to the invention and including a collar extending transversely inward from an inside surface of the instrument panel, an integral air bag deployment door in a closed position and a plastic insert molded hinge.

As shown in FIG. 15, the instrument panel 100c of the fourth embodiment includes a collar 114 that integrally extends transversely inward from the inside surface 102c and from around the door panel 14c. The collar 114 defines a door-collar interface 116 along a region where the collar 114c extends from the unitary panel 14c, 100c. The collar 114 forms a sleeve for receiving an air bag canister assembly 18c. In other embodiments, the collar 114 may serve as a guide chute for a deploying air bag. The hinge panel 51c spans the door-collar interface 116. An inner portion 56c of the hinge panel 51c is attached to the collar 114 and an outer portion 60c of the hinge panel 51c is attached to the door panel 14. A styling groove 108c may be aligned with the portion of the door-collar interface 116 that the hinge panel 51c spans. The styling groove 108c is formed into the outside or "class A" surface 104c to aid upward bending of the door panel 14c.

In practice, air bag cover assemblies 10a–c can be made by first providing a mold having first and second mold portions. The first and second mold portions form a mold cavity when closed together. The mold cavity has a shape that complements the shape of whichever unitary panel 14a–c, 100a–c and hinge panel 51a–c is to be formed. A hinge panel 51a–c is formed from the second plastics material, metal or a combination thereof and is placed in the second mold portion. The hinge panel 51 is placed in a portion of the mold cavity in the second mold portion in a position spanning a portion of the mold configured to form the juncture zone 112a, 106b or interface 116 between the door panel 14a–c and either the instrument panel 100b of the second embodiment, the hinge flange 36a of the third embodiment or the collar 114 of the fourth embodiment.

For example, to form a cover assembly 10a according to the second embodiment, i.e., a hinge-flange version of the invention, the mold cavity surface of the second mold portion is shaped to receive the hinge-flange 36a. The hinge panel 51a is placed on the mold cavity surface of the second mold portion in a position spanning a portion of the mold configured to form the flange juncture zone 112a between the hinge-flange 36a and the door panel 14a. In this case, the mold cavity surface of the second mold portion has a shape complementing that of the inside surface 102a of the unitary panel 14a, 100a. The mold is then closed by positioning the first mold portion on the lower mold portion. The first mold portion includes a mold cavity surface shaped to complement the shape of the outside or "class A" surface 104a of the unitary panel 14a, 100a. The first plastics material is then introduced into the mold cavity in molten form. The molten first plastics material is allowed to conform to the shape of the mold cavity and to solidify in the mold cavity. The mold is then opened and the completed assembly 10a is removed from the mold with the hinge panel 51a molded into the unitary panel 14a, 100a as shown in FIG. 8.

The invention has been described in an illustrative manner with respect to presently preferred embodiments, and it is to be understood that the terminology that has been used is intended to be in the nature of words of description rather than words of limitation. obviously, many modifications and variations of the present invention in light of the above teachings may be made. It is therefore to be understood that within the scope of the appended claims, the invention may be practiced otherwise than as specifically shown and described.

What is claimed is:

1. A method of forming a motor vehicle instrument panel with an integral air bag deployment door comprising the steps of:

molding an instrument panel with a first plastic material to a desired shape and with an integral air bag deployment door;

forming a layer of a second plastic material on an inside surface of at least a portion of the door to provide a tether wherein the second plastic material bonds to the first plastic material and remains ductile at temperatures below the temperature at which the first plastic material becomes brittle; and retaining the door from entering a passenger compartment of the motor vehicle with the tether upon opening movement of the door by an inflating air bag.

2. The method of forming a motor vehicle instrument panel with an integral air bag deployment door of claim 1 wherein the tether is formed by spraying.

3. The method of forming a motor vehicle instrument panel with an integral air bag deployment door of claim 1 wherein the tether is formed by gravity molding.

4. The method of forming a motor vehicle instrument panel with an integral flexibly tethered air bag deployment door of claim 1 wherein the tether is formed by reaction injection molding.

5. The method of forming a motor vehicle instrument panel with an integral air bag deployment door of claim 1 wherein the tether is formed by resin transfer molding.

6. The method of forming a motor vehicle instrument panel with an integral air bag deployment door of claim 1 wherein the tether is formed by injection molding.

7. The method of forming a motor vehicle instrument panel with an integral air bag deployment door of claim 1 wherein the method includes forming said instrument panel wherein said instrument panel contains a fracture zone which separates said air bag door frame said instrument panel and wherein said second plastic material spans a portion of said fracture zone.

8. A cover assembly for an inflatable air bag of a motor vehicle, the assembly comprising:

an instrument panel comprising a first plastic material;

an air bag door panel comprising the first plastic material and formed with the instrument panel as an integral panel;

an air bag door hinge location in the integral panel;

an insert molded hinge panel attached to the integral panel with the first plastic material, the hinge panel in contact with and attached across the air bag door hinge location, the hinge panel providing a hinge which bends with a deployment of the air bag, the hinge not consisting of an inverted semicircular hump having a sharp corner at an edge thereof;

and wherein the integral panel includes a collar extending inward from an inside surface and around the door panel defining a door-collar interface;

and the hinge panel spans the door-collar interface, a portion of the hinge panel attached to the collar.

9. A cover assembly as defined in claim 8 in which a foam layer is disposed over the integral panel and a skin layer is disposed over the foam layer.

10. A cover assembly as defined in claim 8 in which the hinge panel spans a panel juncture zone between the door panel and the instrument panel.

11. A cover assembly as defined in claim 10 in which the panel juncture zone includes a groove separating at least a portion of the door panel and the instrument panel.

12. A cover assembly as defined in claim 10 in which the panel juncture zone includes a tear seam.

13. A cover assembly as defined in claim 11 in which the groove promotes bending of the first plastic material.

14. A cover assembly as defined in claim 11 in which the groove functions as a tear seam.

15. A cover assembly as defined in claim 8 in which the hinge panel comprises a second plastic material.

16. A cover assembly as defined in claim 15 in which the second plastic material is more ductile than the first plastic material.

17. A cover assembly as defined in claim 8 in which the collar secures the integral panel to a structural member.

18. A cover assembly as defined in claim 8 in which a portion of the hinge panel is located between an inside surface of the instrument panel and the air bag.

19. A cover assembly for an inflatable air bag of a motor vehicle, the assembly comprising:

an instrument panel comprising a first plastic material;

an air bag door panel comprising the first plastic material and formed with the instrument panel as an integral panel;

a panel juncture zone between said door panel and said instrument panel;

an insert molded hinge panel attached to the integral panel with the first plastic material, the hinge panel in contact with and attached across said panel juncture zone, the hinge panel providing a hinge which bends with a deployment of the air bag, the hinge not consisting of an inverted semicircular hump having a sharp corner at an edge thereof;

and wherein the integral panel includes a collar extending inward from an inside surface and around the door panel defining a door-collar interface;

and the hinge panel spans the door-collar interface, a portion of the hinge panel attached to the collar.

20. A cover assembly as defined in claim 19 in which the hinge panel is attached to an inside surface of at least one of the instrument panel and the door panel.

21. A cover assembly as defined in claim 19 in which the hinge panel comprises a second plastic material and the second plastic material is more ductile than the first plastic material.

22. A cover assembly as defined in claim 19 in which at least a portion of the panel juncture zone includes a groove.

23. A cover assembly as defined in claim 19 in which at least a portion of the panel juncture zone includes a tear seam.

24. A cover assembly as defined in claim 19 in which the integral panel fractures with a deployment of the air bag.

25. A cover assembly as defined in claim 24 in which the fracture results in separation of the door panel from the integral panel, the hinge panel retaining the door panel.

26. A cover assembly as defined in claim 19 in which a portion of the hinge panel is located between an inside surface of the instrument panel and the air bag.

27. A method for making an air bag cover assembly, the assembly including an instrument panel and an air bag door panel comprising a first plastic material and formed as an integral panel, and a hinge panel attached to the integral panel with the first plastic material, the hinge panel attached across an air bag door hinge location, the hinge panel providing a hinge which bends with a deployment of the air bag, the hinge in contact with and attached across said air bag door hinge location and not consisting of an inverted semicircular hump, having a sharp corner at an edge thereof, the method comprising the steps of:

providing a mold having first and second mold portions, the first and second mold portions forming a mold cavity when closed together, the mold cavity having a shape complementing the shape of the integral panel and the hinge panel;

forming the hinge panel;

placing the hinge panel in the mold cavity;

closing the mold;

introducing the first plastic material into the mold cavity;

allowing the first plastic material to conform to the shape of the mold cavity and to solidify in the mold cavity; and opening the mold and removing the completed assembly from the mold;

and wherein the step of providing a mold includes the step of shaping the mold cavity to form a flange that protrudes inward from the door panel portion of the integral panel;

and the step of placing the hinge panel includes the step of placing the hinge panel in the second mold portion in a position spanning a portion of the mold configured to form a juncture zone between the flange and the door panel.

28. The method of claim 27 in which the step of forming the hinge panel includes the step of forming a hinge panel comprising a second material.

29. The method of claim 28 in which the step of forming the hinge panel includes the step of providing a second plastic material that is more ductile than the first plastic material.

30. The method of claim 27 in which the step of placing the hinge panel in the cavity includes the step of placing the hinge panel in the mold cavity such that the hinge panel will be located between an inside surface of the instrument panel and the inflatable air bag.

31. A cover assembly as defined in claim 8 in which the hinge panel comprises metal.

* * * * *